Dec. 22, 1953 A. G. JUILFS Re. 23,756
STAPLE FEED MECHANISM FOR PORTABLE PNEUMATIC STAPLERS
Original Filed Aug. 23, 1950 2 Sheets-Sheet 1
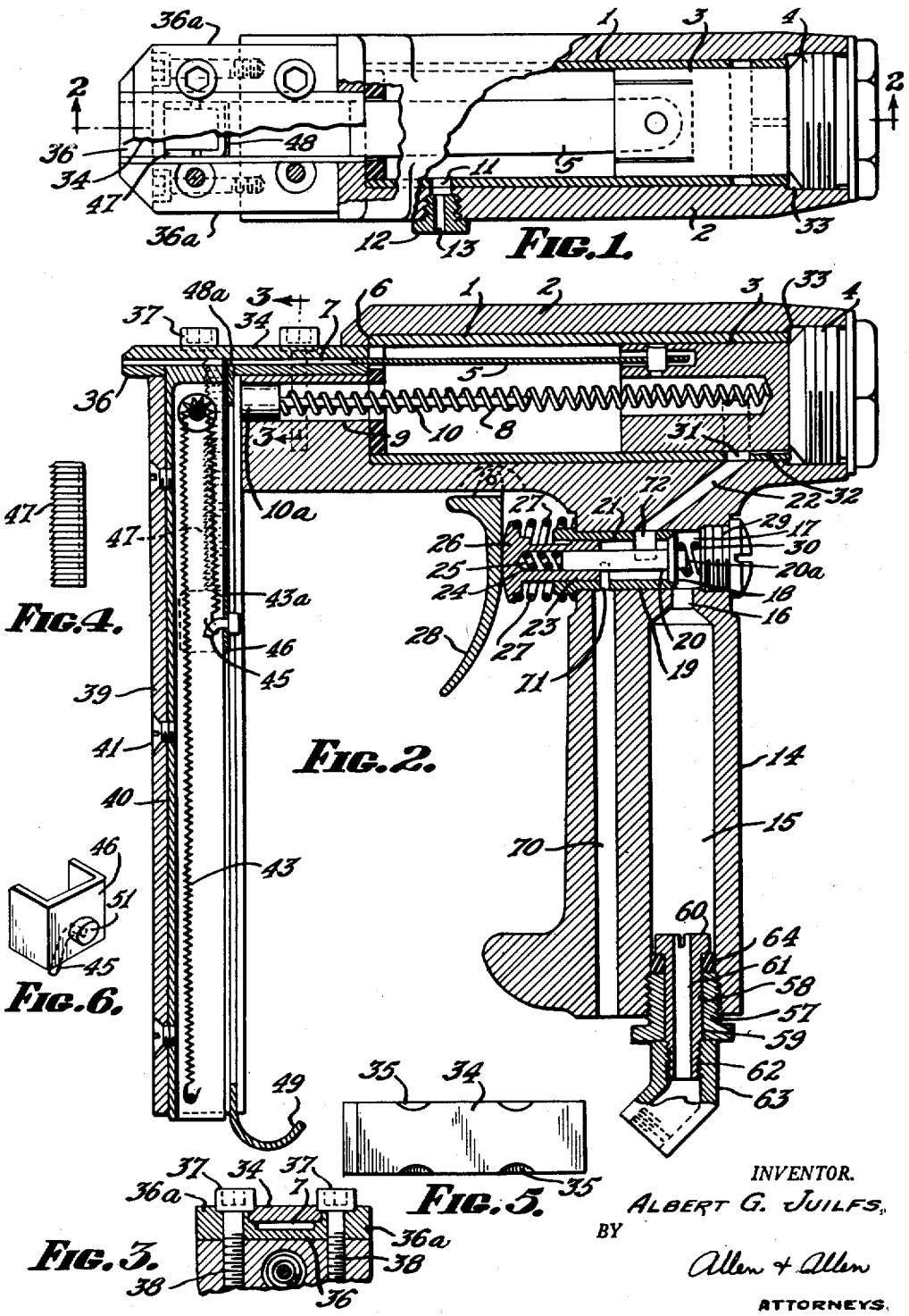
INVENTOR.
ALBERT G. JUILFS,
BY
Allen + Allen
ATTORNEYS.

Dec. 22, 1953 A. G. JUILFS Re. 23,756

STAPLE FEED MECHANISM FOR PORTABLE PNEUMATIC STAPLERS

Original Filed Aug. 23, 1950 2 Sheets-Sheet 2

INVENTOR.
ALBERT G. JUILFS,
BY
Allen + Allen
ATTORNEYS.

Reissued Dec. 22, 1953 Re. 23,756

UNITED STATES PATENT OFFICE 23,756

STAPLE FEED MECHANISM FOR PORTABLE PNEUMATIC STAPLERS

Albert G. Juilfs, Newtown, Ohio, assignor to Senco Products, Inc., Cincinnati, Ohio, a corporation of Ohio Original No. 2,585,942, dated February 19, 1952, Serial No. 181,024, August 23, 1950. Application for reissue February 10, 1953, Serial No. 336,215

4 Claims. (Cl. 1—44.4)

Matter enclosed in heavy brackets [ ] appears in the original patent but forms no part of this reissue specification; matter printed in italics indicates the additions made by reissue.

My invention relates to a portable pneumatic stapler primarily designed for stapling upholstery to the interior of automobile bodies, and in particular this invention relates to novel staple feed mechanism for such a stapler. This application is an improvement on my copending application entitled Staple Magazine and Feed Means for Pneumatic Staplers, filed November 23, 1949, bearing Serial No. 128,941, and issued as U. S. Letters Patent No. 2,585,941 on February 19, 1952. Reference is also made to my copending applications as follows: Staple Drive Mechanism for Portable Pneumatic Staplers, filed of even date herewith and bearing Serial No. 181,023; Staple Driving Means for Portable Pneumatic Staplers, filed of even date herewith, bearing Ser. No. 181,025 and issued as U. S. Letters Patent No. 2,585,939 on February 19, 1952; and Valve Control System for Portable Pneumatic Stapler, filed of even date herewith, bearing Ser. No. 181,026, and issued as U. S. Letters Patent No. 2,585,940 on February 19, 1952.

A principal object of the present invention is to provide a staple feeding track which is easily and quickly loaded with staples with a minimum of effort and which has no projecting movable staple follower to catch on the clothing of the operator or in any way interfere with the action of the staple driver.

A further important object of this invention is to provide staple feeding means which will hold a much larger supply of staples than will the feed means employed in conventional staplers of corresponding size.

Figure 7:
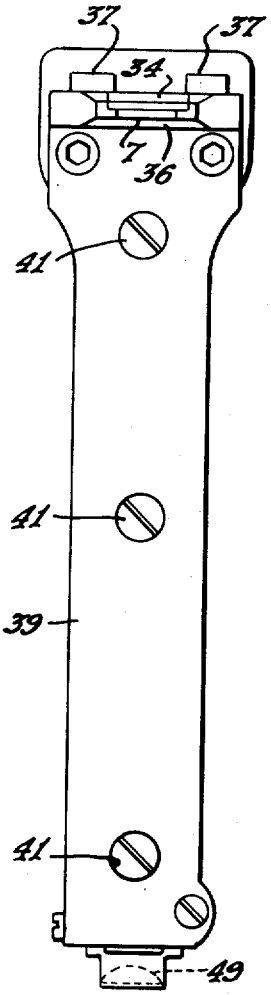
Figure 8:
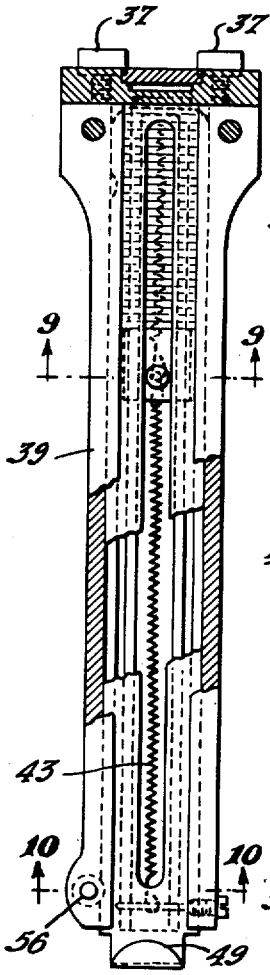
Figure 11:
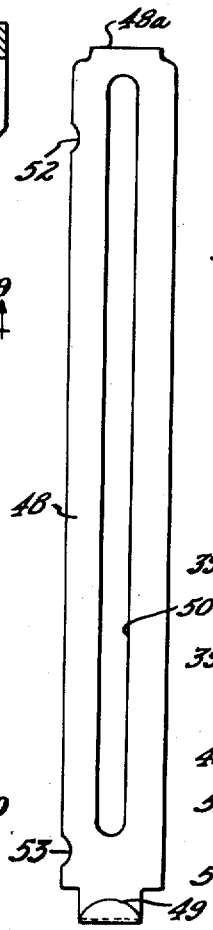
Figure 9:
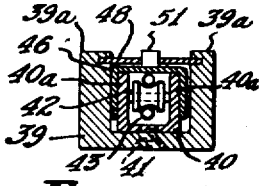
Figure 10:
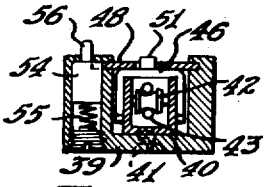
Figure 12:
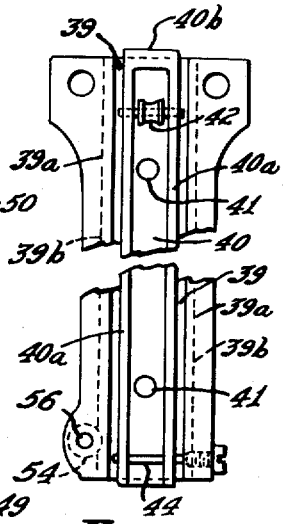

These and other objects and advantages of my invention will become apparent to those skilled in the art during the course of the following description and from reference to the accompanying drawings in which like numerals are used to designate like parts throughout the same, and in which:

Figure 1 is a plan view of my pneumatic stapler with a portion cut away and a portion in section in order to show the internal mechanism of the stapler, Figure 2 is a cross section of the stapler shown in Figure 1 taken on the section line 2—2 of Figure 1, Figure 3 is a cross section of a portion of the forward end of the stapler taken on the section line 3—3 of Figure 2, Figure 4 is a side elevation of a portion of a strip of staples used in my stapler, Figure 5 is a plan view of a strap which forms the top wall of the staple driving guide, Figure 6 is a perspective view of the staple follower, Figure 7 is a front elevation of my stapler as viewed from the left side of Figure 2, Figure 8 is an elevation of the staple slide, as viewed from the right side of Figure 2, with a portion broken away to show the underlying features, Figure 9 is a cross section taken on the line 9—9 of Figure 8, Figure 10 is a cross section taken on the line 10—10 of Figure 8, Figure 11 is a plan view of the staple track cover, and Figure 12 is a plan view of the staple track with a portion broken away to reduce its length.

Briefly, in the practice of my invention, a portable pneumatic stapler including a cylinder having a piston is actuated by compressed air. The piston drives a staple driver which picks up a staple from the feed and drives it through the material and into the base to which the material is to be attached.

The piston is actuated by the compressed air in its drive but returned to its home position by a helical spring.

The staple feed consists of a staple track upon which rides a staple follower. On top of the staple track I provide a magazine cover which is longitudinally slidable in a second track positioned over the staple track and which in turn has a slot which receives a projecting boss on the staple follower. One end of this cover projects beyond the track and terminates in a hook-shaped finger grip. In order to feed the staples uniformly, I provide a spring, one end of which is attached near one end of the staple track and the body of which rides over a sheave near the other or staple feeding end of the track. The other end of this spring is attached to a staple follower which rides on the staple track. The spring lies within the track and is straddled by the staples placed about the track. By this means the spring which feeds the staples is extremely long so that tension at all times is uniform. In loading the stapler, the cover is pulled down along its track. This in turn pulls the staple follower towards one end of its track. Staples are then placed about the track, the follower returned and the cover forced completely into its track. *When forced into this position an end of the cover projects to a position flush with the bottom of the track in which the staple driver rides.* The slot in the cover permits the cover to be forced into closed position even though the follower must initially remain near that end of the track removed from the gun nose, and it also permits the follower to move along the track and feed the staples as so urged by the spring.

Referring to the drawings, I provide a cylinder 1 located in the stapler housing 2 and carrying the piston 3. One end of the cylinder 1 is enclosed by the plug or cylinder head 4. There is a staple driver 5 pinned to the piston 3 which projects beyond the opposite end 6 of the cylinder onto a guiding track 7. The end 6 of the cylinder 1 is closed by the housing 2, excepting for the track 7 which is closed by the driver 5. The piston 3 is urged to its retracted position by the helical spring 8 which is based in an aperture 9 in the housing 2. The spring 8 is kept in line by a rod or pin 10, also based in the housing 2 and aperture 9. This rod 10 may be fixed to a plug 10a which just nicely fits within the bore or aperture 9.

Since the portion of the cylinder 1 between the piston 3 in its retracted position and the end of the gun is thus sealed, a vent 11 is provided in a side wall of the cylinder 1 and a corresponding vent is provided in the housing 2. These vents are located between the piston 3 in its retracted position and the head 6 to permit the exhaust of the air within the cylinder when the piston is actuated. The vent 11 is positioned slightly short of the end 6 so that as the piston 3 passes the vent 11, air is entrapped between the piston 3 and the forward end of the gun, thus forming a cushion. In order to permit the use of different air pressures in actuating the gun, I provide a nipple 12 having an aperture 13. This nipple is located in the housing vent which corresponds to the cylinder vent 11. Different nipples 12 are provided having different sized apertures 13 so that the appropriate nipple may be used with the gun, depending on the air pressure used to operate the gun. Also the striking power of a staple gun constructed according to my invention can be easily changed without having to change the air pressure all over the plant. This is a distinct feature of my invention and one not to be found in other staple guns known to me.

The handle portion 14 of the gun contains a pressure chamber 15, the lower end of which is attached to the compressed air line. The upper end terminates in a passageway 16 which communicates with a chamber 17. Within the chamber 17 is a valve 18 seated against one and of a sleeve 19 so as to seal off the interior of this sleeve from the passageway 16 and chamber 17. The valve 18 is mounted on a rod 20 within the interior or chamber portion 21 of the sleeve 19. There is a passageway 22 which communicates within the chamber 21 and the inlet port of the cylinder 1.

Slidably mounted within the sleeve 21 is a bushing 23 which has an internal bearing 24 to accommodate the end of the rod 20 carrying the valve 18. Within this bearing is a relatively weak coil spring 25 which urges the rod 20 away from the closed end of the bushing 23. The bushing 23 terminates in an abutment 26 which is urged from the handle 14 by a relatively strong helical spring 27. I also provide a trigger 28 pivoted in the stapler body or housing 2 to assist in the pressing of the operating button 26. Located between the valve 18 and a plug 29, and about an extension 20a of the rod 20, there is positioned a spring 30.

From the above, it is apparent that as the trigger 28 is squeezed and the button 26 pressed against the pressure of the spring 27, first of all the relatively weak spring 25 is depressed, since the air pressure in the chamber 17 (plus the pressure of spring 30) against the valve 18 is normally greater than the tension of the spring 25. However, as the spring 25 is further depressed its tension increases until it bears the pressure of the air in the chamber 17 and spring 30. This opens the valve 18 slightly and then the spring 25 snaps the valve 18 wide open. This is explained as follows. At the instant the valve member is first cracked, air bleeds past the member 18 into the chamber 21, through the passageway 22 and through a longitudinal slot 32, to be described, where it meets the resistance offered by the small slot 32 and the piston 3. Pressure then builds up in the chamber 21 (the exhaust port 71 being closed as will be described) and this pressure helps to counterbalance the air pressure in chamber 17 and the tension in spring 30. When this condition exists the compression of spring 25 serves to force the valve member 18 to its full open position suddenly. Such condition comes into existence very soon after the valve is first slightly cracked in the manner described. It should be noted that the result will be the same regardless of how slowly the trigger 28 is pulled; all that matters is that the spring 25 is finally so compressed that the valve is first cracked slightly—the sudden and complete opening of the valve will then occur automatically if the other parts are arranged as described. By this arrangement the operation of my staple gun is made independent of the "touch" of the operator; even and smooth driving power and operation are thus assured at all times.

The inlet passageway 22 terminates in a port 31 of substantial size. There is a small groove 32 cut in the inner wall of the cylinder 1 under the piston 3 in its retracted position which runs to the rear of the piston 3, so that as air is admitted to the rear of piston 3 by the groove 32 there is a relatively short, slow travel of the piston 3 and then a hard, rapid travel when it passes the port 31. To this end there is provided an annular recess 33 near the head 4 which communicates with the groove 32.

Also provided in the handle 14 of the staple gun is an exhaust passageway 70. This passageway communicates with the chamber 21 through an exhaust port 71 formed in the sleeve 19. Another port 72 is formed in the sleeve 19 and this latter port communicates with the passageway 22.

The operation of this valve arrangement is as follows. When the trigger 28 is pulled and the button 26 thereby depressed the valve 18 is moved away from the end of the sleeve 19 in the manner above described. Air then passes from the chamber 15, through the passageway 16, into the chamber 17, past the valve 18 into the chamber 21, through the port 72, into the passageway 22, through the port 31 and groove 32, and piles up behind the piston 3 thereby moving it away from the head 4. When the piston 3 moves past the port 31 a larger amount of air enters behind the piston and drives it hard and fast whereby the staple driver 5 picks up a staple 47 positioned in the slot 7 and drives it into the work. Such drive is cushioned by the air cushion governed by vent nipple 12. During this time the exhaust port 71 is blocked by the bushing 23.

On release of the trigger 28 the spring 27 returns the button 26 to the position of Figure 2 and the spring 8 returns the piston 3 to its starting position. Air collected between the piston 3 and head 4 is exhausted out the port 31 (and groove 32), through the passageway 22, through the port 72 into chamber 21, out port 71 (valve 18 now seating against the end of sleeve 19) and finally through the exhaust passageway 70.

The large air chamber 15 permits the use of relatively small air lines thereby making the staple gun very easy to manipulate.

The staple driver 5 is pinned at one end to the piston 3 and the head or driving end rides in a groove or slot 7. The slot 7 is closed by means of a plate 34 which has beveled or cut away portions 35 (see Figure 5). The plate 34 when placed in position over the passageway 7 rests between two straps 36a of a member 36 (this member forming the bottom of slot 7) and is held in position by the heads 37 of the bolts 38 resting in the indentations 35 (see Figure 3). This permits the easy removal and replacement of the plate 34 and the availability of the passageway 7 and the nose and feed mechanism in the event a staple becomes jammed.

A particular feature of the novel drive mechanism just described—and of the slot forming portions 34 and 36—is that by this construction the nose of the gun, and the driver 5 operating therein, can be changed without changing the stroke of the piston. Such arrangement makes my staple gun quite adaptable to a great many jobs that can't be handled by conventional guns having a fixed staple drive condition. For example, by replacing the staple driver 5 with a longer member, and by substituting longer members for the slot forming portions 34 and 36, a staple gun having a staple ejecting nose which protrudes a considerable extent past the staple feed track may be achieved. A gun having such a long, relatively thin nose can be used to do stapling in deep crevices not accessible to the ordinary gun. The amount by which the length of the driver 5 can be increased is determined, see Figure 2, by the distance between the forward end of the staple driver 5, when the piston 3 is in its retracted position, and the point at which the feed track brings staples into position in the slot 7.

It should also be noted that I have so arranged the driver 5 and piston 3 that the driver is located or pinned to the piston above its center. By so positioning the driver 5 I have provided a staple gun which can be used in crevices and the like heretofore not accessible to staple guns of this general type.

The staple feeder consists of a base plate 39 which carries a substantially U-shaped staple track 40 (see Figures 9 and 10). The base member 39 is itself U-shaped and the track 40 is held within the member 39 by bolts 41. At the nose end of the staple track 40 is placed a sheave 42 which is preferably embraced by the legs 40a of the track 40. *The forward end 40b of the feed track 40 extends beyond the base or housing member 39 and is designed to be in a position flush with the bottom or inner face of the drive track in which the staple driver rides, the member 39 abutting the plate structure defining the drive track 7 and the portion 40b extending into such plate structure.* A long helical spring 43 is attached at one end of the staple track by a pin 44. The spring 43 then runs up between the track legs 40a and over the sheave 42 returning down the track as at 43a. This end 43a of the spring 43 is fastened to a pin 45 on the staple pusher or follower 46. The follower is shown in Figure 6 and straddles the track legs 40a following the row of staples 47 which also straddle the legs 40a. From this construction, it is apparent that the spring 43 forces the row of staples 47 along the track 40 towards the nose of the gun. Since the spring 43 is quite long, running from the base or entrance of the track 40, the full length of the track over a sheave 42 and then back to the follower 46, its pressure on the staples is fairly constant. This also permits the feeding of the staples 47 the full length of the track.

I provide a magazine cover 48 which has a finger grip 49 at one end *and a projection 48a at the other end.* The cover 48 has a longitudinal slot 50 in which a boss 51 on the staple follower 46 rides. The cover 48, when in position, not only covers the staples 47 but it also acts as part of their guiding track. To this end the cover 48 is adapted to slide within a pair of slots 39b formed in the legs 39a of the base plate 39 (see Figures 9, 10 and 12). When it is desirable to load the stapler, the finger grip 49 of the cover 48 is grasped and this cover 48 pulled downwardly away from the nose of the gun. This pulls the staple follower 46 as far down as desirable and preferably completely to the lower end of the track 40 against the pin 44. As the cover 48 is slid down the track 40, it is exposed and a new strip of staples may be easily placed on the track 40 about the legs 40a and ahead of the follower 46. The cover 48 is then pushed back into position to cover the staples 47 and the spring 43 then acts on the follower 46 to bring it and the stack of staples towards the nose end of the gun.

*When the cover 48 is in its closed position the projecting end 48a thereof is flush with the bottom of the drive track or slot 7. Since the cover 48 serves as a part of the feed or guide track it will be observed that the staples are thus provided with an uninterrupted guiding surface during the time they are in the feed magazine and up until the very moment they are discharged into the drive track or slot 7.*

*In all prior art structures known to me it is customary for the magazine cover or corresponding surface to abut the body of the staple gun adjacent the opening through which the staples are moved into the drive track. This means that as the staples are pushed from beneath the cover or similar guiding surface into the opening leading to the drive track they must pass beneath the juncture of such cover or surface with the gun body. And at this juncture there is a slight transverse crack which will vary in size depending on the precision with which the gun is made and the amount and kind of use to which the gun has been subjected.*

*The small crack just described, and existing in all other staple guns known to me, is a constant source of irritation and trouble. Often times a staple, as it moves toward the drive track or slot under pressure, will ride up into this crack and cause jamming. This, of course, is most undesirable.*

*I have solved this problem by utilizing a structure wherein the magazine cover or guiding surface projects into the opening, through which the staples pass to reach the drive track or slot, to a position flush with the bottom of this drive track or slot. This structure differs considerably from those structures wherein such cover or guide surface abuts the body of the gun adjacent said opening. By my structure I have provided an arrangement wherein the guide surface of the staple feed track is uniterrupted by any cracks which might lead to jamming.*

In order to maintain the cover 48 in its closed position or in its extreme open position, I provide two notches or indentations 52 and 53 (see Figure 11). In the base or housing 39 a spring urged button 54 is mounted (see Figure 10). The button 54 is normally held in its upward position by a spring 55 so that it will rest in either the notch 52, when the cover 48 is in its open or lower position, or notch 53 when it is in its closed position. There is a projecting button or nipple 56 on the button 54 which may be depressed by the finger thus forcing the button 54 downwardly and out of the notch 52 or 53.

By this construction, a staple feeder is provided which permits the easy loading of the whole staple track without the necessity of having to completely remove any single part.

The staples 47 are continually fed into the nose of the gun and positioned in the slot 7 between the members 34 and 36 by the spring 43 and follower 46. When the driver 5 has picked up one of the staples and forced it out of the gun, another staple will be forced into the slot as the driver returns to its retracted position as seen in Figure 2.

In order to permit the easy manipulation of my gun, I provide a swivel coupling at the end of the chamber 15 and the handle 14 of the gun. This swivel connection consists of a nipple 57 screwed into the end of the chamber 15 and having a bore 58. A second nipple 58 is slidably positioned in the bore 58 of the nipple 57 with an annular head 60 within the chamber 15. The head 60 is larger than the body portion 59, so a shoulder or flange is formed which projects out over the inner end of the nipple 57 and prevents the nipple 59 from sliding out. An air passageway 61 is drilled through the nipple 59 and its outward end 62 is screwed into a hose coupling 63.

Between the head 60 of the nipple 59 and the end of the nipple 57, I provide an annular gasket 64.

From the above, it is apparent that when pressure is built up in the chamber 15, appreciable force is exerted against the head 60 of the nipple 59 attempting to drive it outwardly. However this pressure forces the head 60 against the gasket 64 and thus provides a tight seal between the nipple 59 and the chamber 15. The nipple 59 may, however, be rotated within the nipple 57 and permit the easy movement of the gun during its operation.

From the above, it is apparent that I have provided a portable pneumatic stapler which is compact and light and which may be used in remote and inaccessible spots and corners.

The stapler may be used on air lines having different air pressures by merely changing the vent nipple 12 (Figure 1) to accommodate the different pressures. A novel feed is provided for the staples which permits a maximum of staples to be loaded without any projections riding with the staples which would catch in the clothing of the operator and tend to destroy the feed.

The connection between the air line and the gun itself is rotatable and hence the gun may be handled and placed in different positions with a minimum of difficulty.

The passageway which accommodates the staple driver 5 and the port through which the staples are fed into the nose of the gun are easily accessible by the mere removal of the two or more bolts.

A positive trigger mechanism is provided which insures the complete and efficient stroke of the piston no matter how slowly the trigger mechanism is depressed.

It is to be understood that modifications and changes can be made in my invention without departing from the scope and spirit thereof, and while I have shown my invention as embodied in certain structure for purposes of illustration, I do not intend to be limited by such structure except insofar as it is incorporated in the subjoined claims. It should be further understood that while I have shown certain novel features of staple gun construction in combination with one another—so that a full and complete disclosure of an operative staple gun could be made—many of these features can be employed independently of one another. Thus the particular staple feed mechanism herein set forth and claimed may be used with drive mechanisms and valve constructions other than those disclosed herein. Having thus described my invention, what I claim as new, and what I desire to protect by United States Letters Patent is:

1. In a portable pneumatic stapler having pneumatically driven means for driving a staple into a piece of work, a staple feed mechanism for positioning a staple before said staple driving means, said staple feed mechanism comprising; an elongated channel member having upstanding sides and being open at the top, a spring lying within said channel member, one end of said spring being fixed near one end of said channel member, a staple follower adapted to straddle said upstanding sides and bridging said open top, said follower riding on said upstanding sides behind a supply of staples, a pin depending from said follower, said spring being looped around a member positioned near the other end of said channel member, the other end of said spring being fixed to said pin, a cover positioned above said open top and slidable thereover, said cover having a slot, and a boss on said follower adapted to engage in said slot, whereby said follower may move on said channel member under the tension of said spring, said cover protecting said follower and said staples; a second channel member generally corresponding to said first mentioned channel member, said first channel member being fixed within said second channel member, said second channel member having upstanding sides spaced from and substantially parallel to said first mentioned upstanding sides, whereby said follower and said staples straddle said first mentioned sides only, said second channel member serving as a guard for said follower and said staples; said second mentioned upstanding sides being provided with slots in which said slotted cover is slidably positioned; said cover being provided with indentations along one of its edges, a catch member positioned within an opening provided in said second channel member, a plug in said opening, a spring between said plug and said catch member, an abutment fixing the extent of movement of said catch member by said spring, said catch member normally extending into one of the slots provided for said cover in said second upstanding sides whereby it engages within a said indentation, and a boss on said catch member, said boss extending through said abutment, whereby depressing said boss moves said catch member against said spring and out of engagement with said indentation to permit movement of said cover within said slots.

2. The staple feed mechanism of claim 1 in which there are two of said indentations, one located near each end of said cover, said indentations and said catch serving to limit the extent of slide of said cover.

3. In a portable pneumatic stapler having pneumatically driven means for driving a staple into a piece of work, a staple feed mechanism for positioning a staple within a slot before said staple driving means, said staple feed mechanism comprising: an elongated channel member having upstanding sides and being open at the top, a spring lying within said channel member, one end of said spring being fixed near one end of said channel member, a staple follower adapted to straddle said upstanding sides and bridging said open top, said follower riding on said upstanding sides behind a supply of staples, a pin depending from said follower, said spring being looped around a member positioned near the other end of said channel member, the other end of said spring being fixed to said pin, a cover positioned above said open top and slidable thereover, said cover having a slot, and a boss on said follower adapted to engage in said slot, whereby said follower may move on said channel member under the tension of said spring, said cover protecting said follower and said staples; a second channel member generally corresponding to said first mentioned channel member, said first channel member being fixed within said second channel member, said second channel member having upstanding sides spaced from and substantially parallel to said first mentioned upstanding sides, whereby said follower and said staples straddle said first mentioned sides only, said second channel member serving as a guard for said follower and said staples, said second mentioned upstanding sides being provided with slots in which said slotted cover is slidably positioned; and means to releasably maintain said cover in a fixed position of closure with respect to said second mentioned upstanding sides, the end of said cover when in said fixed position being flush with the bottom of the said slot into which staples are fed ahead of the staple driving means by said staple feed mechanism.

*4. In a portable pneumatic stapler having pneumatically driven means for driving a staple into a piece of work, and having a drive track to receive staples and in which the driven means operates, said track being formed adjacent one side of a plate and there being an opening in the other side of said plate leading to said drive track: staple feed mechanism comprising a housing containing a feed track upon which the staples are disposed, a staple follower on said track behind said staples, means to urge said follower against said staples, a cover member adjacent the crowns of said staples, said housing abutting said plate about the said opening leading to said drive track, and said cover member having a portion thereof extending beyond said housing through said opening to a position flush with the inner face of said drive track, whereby staples are moved from said feed track to said drive track, the cover member overlying the crowns of the staples up to their very entry into the drive track.*

ALBERT G. JUILFS.

References Cited in the file of this patent or the original patent

UNITED STATES PATENTS

| Number | Name | Date |
|---|---|---|
| 1,987,038 | Vogel | Jan. 8, 1935 |
| 2,288,500 | Vogel | June 30, 1942 |
| 2,441,120 | Libert | May 4, 1948 |
| 2,445,178 | Lindstrom | July 13, 1948 |
| 2,461,165 | Lindstrom | Feb. 8, 1949 |